Sept. 14, 1926.

J. A. SMITH 1,599,684

PRETZEL COOKER

Filed August 25, 1925    2 Sheets-Sheet 1

Inventor
J. A. Smith

By
Attorney

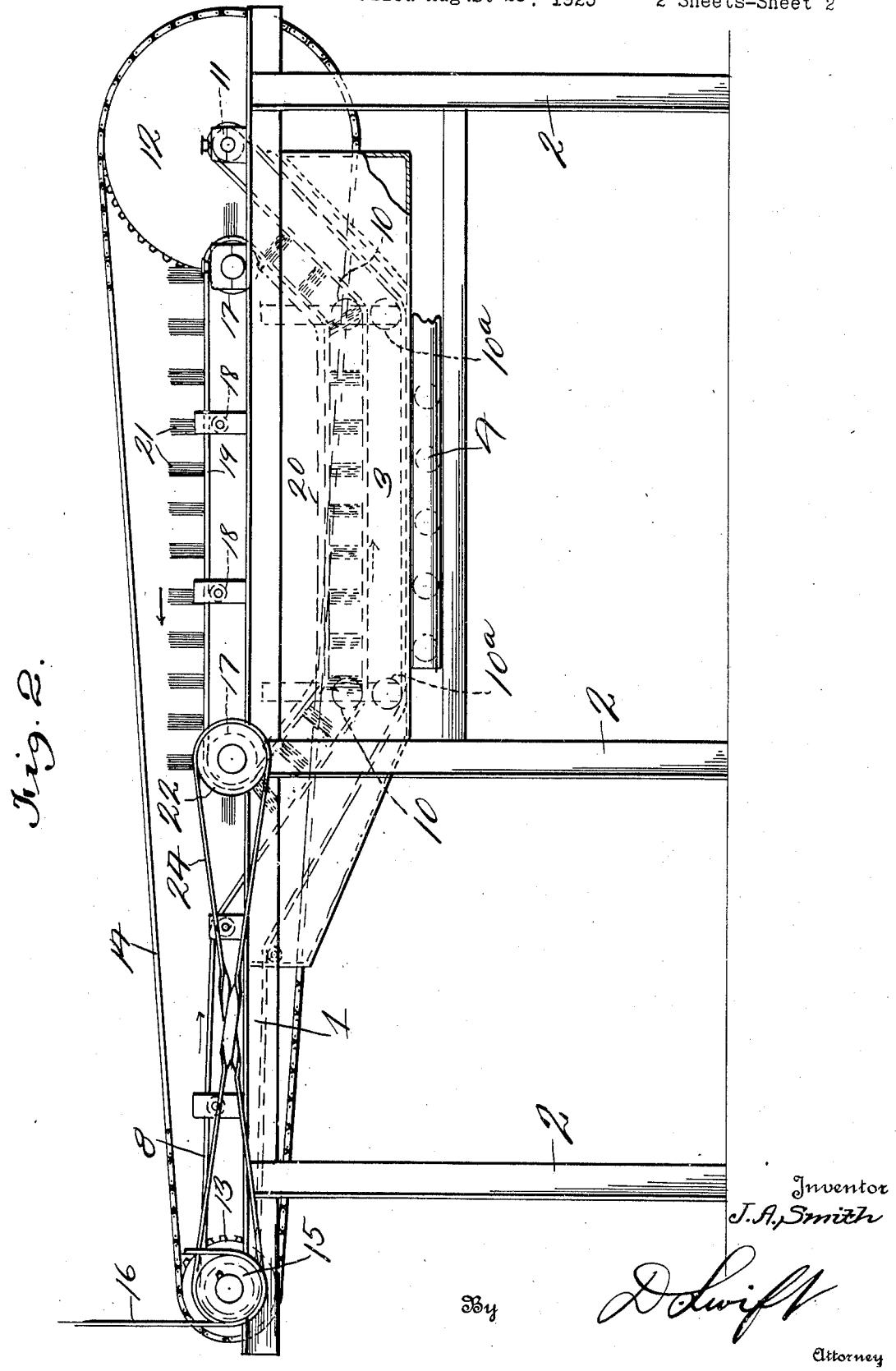

Patented Sept. 14, 1926.

1,599,684

UNITED STATES PATENT OFFICE.

JOHN ALPHINOUS SMITH, OF WILLIAMSPORT, PENNSYLVANIA.

PRETZEL COOKER.

Application filed August 25, 1925. Serial No. 52,364.

The invention relates to pretzel cooking machines, and has for its object to provide a device of this character comprising a frame having a liquid receiving tank, and a heating element under the tank and an endless belt conveyor, onto one end of which pretzels to be cooked are placed, and which conveyor extends downwardly into the tank and upwardly from the other end of the tank and forms means whereby pretzels will be conveyed through the cooking liquid within the tank and cooked and then delivered from the tank, where they can be placed into an oven, the liquid is preferably soda water.

A further object is to provide an endless belt extending over rollers above the tank and movable in the direction of the pretzel conveyor belt and provided with brushes for engaging pretzels on the pretzel conveyor belt and holding the same in their relative positions as they are passed throug the cooking tank.

A further object is to provide driving means for the conveyors whereby all of said conveyors may be operated from a single source of power and from a single driven pulley.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 2 is a side elevation of the machine.

Figure 1:
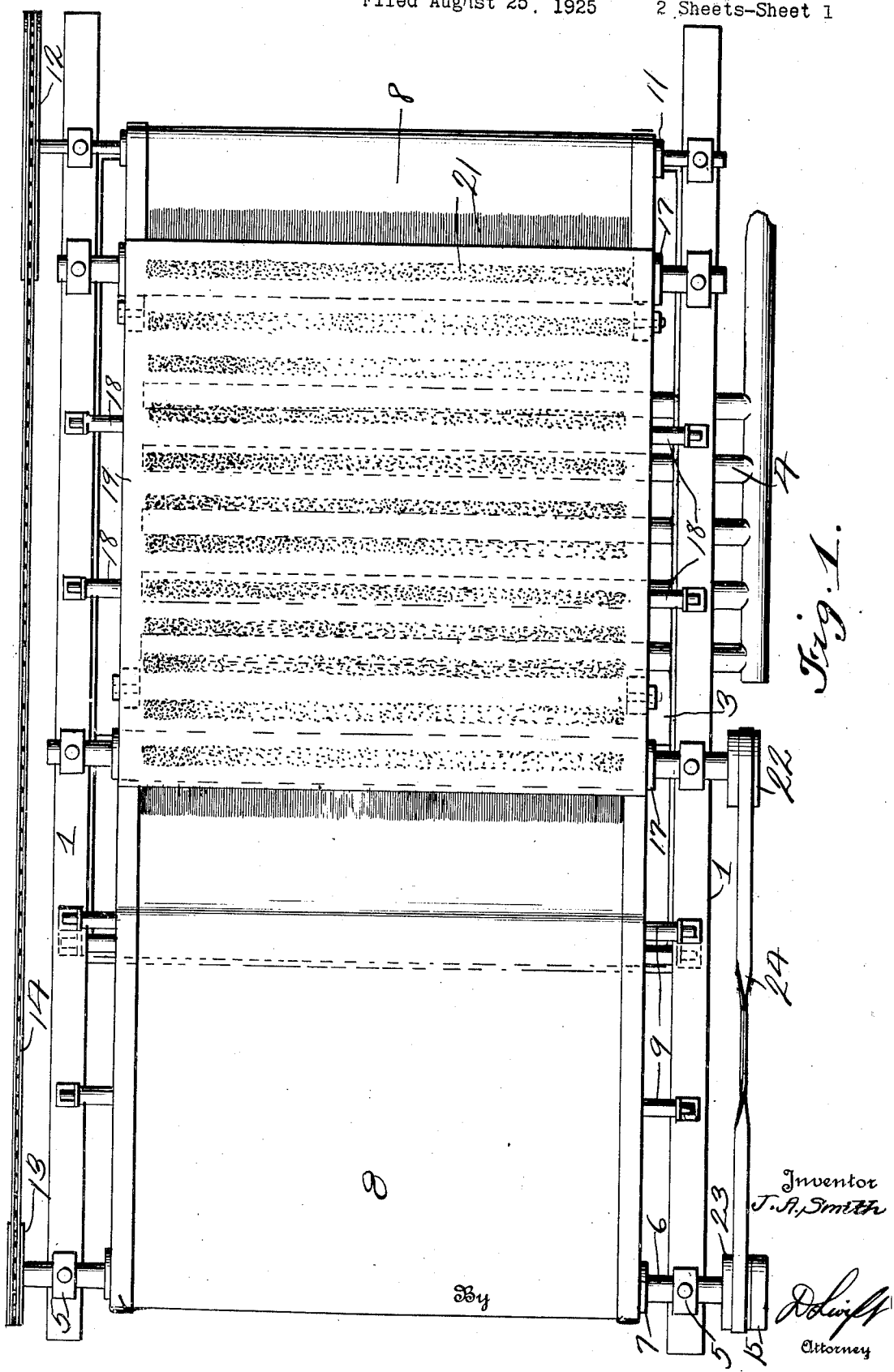
Figure 1 is a top plan view of the machine.

Referring to the drawing, the numeral 1 designates the side rails of the machines, which rails are provided with supporting legs 2. Disposed between the rails 1 is an elongated trough 3, in which soda water is placed, and disposed beneath the tank 3 is a heating element 4, preferably a gas burner, and which gas burner heats the tank 3 and the material therein. Rotatably mounted in bearings 5 adjacent one end of the machine is a drive shaft 6, which drive shaft is provided with a transversly disposed roller 7, which extends across the machine adjacent one end thereof, and extending over said rollers 7 is an endless conveyor belt 8, which belt extends forwardly over the supporting rollers 9, thence downwardly into one end of the tank 3 where it passes under side rollers 10 within the tank. The upper portion of the conveyor belt 8 extends upwardly over one of the rollers 10, and thence over and downwardly over the roller 11, back into the tank and over the rollers 10ª within the tank, and back to the roller 7. It will be seen when pretzels are placed on the upper portion of the conveyor 8, they will be conveyed forwardly and thence downwardly into the cooking tank 3 where they will be submerged in the liquid therein, and will then be conveyed upwardly out of the cooking tank after the cooking operation to a position where they may be easily removed from the conveyor belt and placed in an oven. Roller 11 is provided with a sprocket wheel 12, and over the sprocket wheel 12 and sprocket wheel 13, carried by the shaft 6, an endless sprocket chain 14 extends, therefore it will be seen that when the drive pulley 15, which is carried by the shaft 6 is rotated, the conveyor 8 will be operated at both ends thereof through the medium of the rollers 7 and 11, thereby insuring a uniform movement of the conveyor belt 8, and power is obtained through a belt 16, which constitutes a single source of power for the machine.

Extending over rollers 17 and supporting rollers 18 above the tank 3 is an endless belt 19, the lower portion of which extends downwardly into the tank 3 over the guide apron 20, and the portion of said conveyor 19 in the tank moves in the same direction as the upper portion of the conveyor belt 8. Conveyor 19 is provided with a plurality of brushes 21, which, when the conveyor 19 is moved at the same speed of operation as the conveyor 8, engage the pretzels on the conveyor 8 and hold the same against displacement on the conveyor 8, particularly as they are fed into and out of the cooking tank 3, at which time they are in inclined planes, and may slide. One of the rollers 17 is provided with a pulley 22, and over which pulley 22 and a pulley 23, a crossed belt 24 extends, therefore it will be seen that the brush carrying conveyor, as well as the pretzel feeding conveyor is operated from a single source of power.

From the above it will be seen that a pretzel cooking machine is provided wherein a continuous operation from the feeding of the pretzels is accomplished without handling the material. It will also be seen that the conveyor belt conveys the pretzels through the boiling liquid and thoroughly cooks the same, and the time of cooking may be varied by varying the speed of operation of the machine, and brushing means is provided for cooperating with the pretzels during the feeding and cooking operation.

The invention having been set forth what is claimed as new and useful is:—

1. A pretzel cooking machine comprising a frame, a tank carried by said frame, means for heating said tank, conveyor rollers carried by the frame at opposite ends of the tank, an endless conveyor extending over said rollers and into the tank, guide rollers supporting the upper side of the endless conveyor substantially horizontally adjacent one of its ends, guide rollers disposed within the tank and cooperating with the conveyor whereby it will be guided downwardly into the tank and thence upwardly out of the tank, a second conveyor, rollers carried by the frame and over which the second conveyor extends, an apron disposed within the tank and over which one side of the conveyor moves, said apron cooperating with the lower run of the second conveyor whereby it will be guided in substantially parallel relation to the upper side of the pretzel conveyor within the tank and brushes carried by the second conveyor and cooperating with the pretzel conveyor within the tank.

2. A pretzel cooking machine comprising a tank, a heating unit for said tank, an endless conveyor said conveyor extending downwardly into the tank and upwardly from the tank, an endless conveyor above said first mentioned conveyor, brushes carried by the last mentioned endless conveyor and positioned to engage articles on the first mentioned conveyor and a rigid apron carried by the tank and engaging the inner side of the lower run of the second mentioned conveyor.

3. A pretzel cooking machine comprising a tank, a heating unit for said tank, an endless conveyor extending through said tank, a second endless conveyor above said first mentioned conveyor, said first mentioned conveyor extending downwardly into the tank and upwardly from the tank, the adjacent runs of the conveyors within the tank being in parallel relation, brushes carried by the second conveyor and cooperating with the upper run of the first mentioned conveyor, an apron disposed within the tank and cooperating with the inner side of the lower run of the second mentioned conveyor whereby said lower run of the second mentioned conveyor is maintained in parallel relation to the upper run of the first mentioned conveyor and means for operating said conveyors.

4. The combination with a pretzel cooking machine comprising an endless conveyor extending through a tank, a second holding conveyor above the first mentioned conveyor, brushes carried by the second holding conveyor and adapted to hold articles on the adjacent side of the first mentioned conveyor, means for operating said conveyors, of an apron cooperating with the lower run of the upper conveyor whereby said lower run is held substantially parallel to the upper run of the first mentioned conveyor during the operation of the conveyors.

In testimony whereof I have signed my name to this specification.

JOHN ALPHINOUS SMITH.